Nov. 25, 1941.      W. C. WARE ET AL      2,264,031
REVERSE GEARING
Filed June 15, 1938      2 Sheets-Sheet 1

Inventors,
Walter C. Ware
Russell C. Allen
by
atty

Nov. 25, 1941.  W. C. WARE ET AL  2,264,031
REVERSE GEARING
Filed June 15, 1938  2 Sheets-Sheet 2

Patented Nov. 25, 1941

2,264,031

UNITED STATES PATENT OFFICE 2,264,031

REVERSE GEARING

Walter C. Ware and Russell E. Allen, Taunton, Mass., assignors to Paragon Gear Works, Inc., Taunton, Mass., a corporation of Massachusetts Application June 15, 1938, Serial No. 213,861

2 Claims. (Cl. 74—298)

This invention relates to reverse gearing especially adapted, although not necessarily limited, to marine propulsion.

In the usual type of reverse gearing, clutch mechanism is provided to connect the propeller and engine shafts for conjoint rotation for forward drive and reversing gearing, usually planetary, is provided to connect the shafts through the gearing for reverse drive of the propeller shaft.

With the usual type of gearing the speed of the propeller shaft when the gearing is set for reverse drive is usually less than when the gearing is set for forward drive because of the heretofore unavoidable reduction in speed occasioned by the arrangement of the planetary gearing.

The particular type of reverse gearing with which this invention is concerned includes aligned engine and propeller shaft gears, a planetary pinion carrier associated therewith, a long pinion carried by the carrier and meshing with one shaft gear and overlying but out of mesh with the other shaft gear, and a reversing pinion meshing with the other shaft gear and the long pinion.

It is an object of the present invention to provide a reverse gearing of this type that will drive the propeller shaft in reverse at the same speed as the engine shaft.

While this type of gearing can be made to give the propeller shaft in reverse a speed materially higher or lower than the engine shaft speed, it is not possible to drive the propeller shaft in reverse at the engine shaft speed. To provide equal shaft speeds in both direct and reverse drive necessitates equal pitch diameter shaft gears. This means that the long pinion engages both shaft gears and the reverse gearing hence is inoperative.

A peculiar form of gear and gear tooth has been proposed to avoid the locking of the gears and to obtain equal shaft speeds in reverse but requires special equipment to cut the gear tooth and the gear is otherwise objectionable. It is also unknown to the average boat mechanic who can be expected to get into trouble in replacing parts.

Thus this type of reverse gearing is replaced by a bevel gear type when equal shaft speeds in reverse is desired.

In accordance with the present invention, however, no unusual tooth and gear design is necessitated to secure equal speed of the propeller shaft in reverse and forward drives. The gears are all of standard construction.

In accordance with the present invention the long pinion gear, instead of being made of a single diameter as before, is stepped or is made of two diameters and the shaft gears are of unequal diameter by at least twice the radial length of a gear tooth, and the ratios of the diameters with the engine and propeller gears which they respectively engage, either directly or indirectly through the reversing idler gear, are equal, thereby securing a propeller shaft reverse speed equal to the engine shaft speed in the drive through the gearing. By this arrangement the pinion gear can readily clear the shaft gear from which it is driven so that there is no interference. Such an arrangement constitutes a further object of the present invention.

The provision of reverse gearing to give a reverse speed of the propeller shaft different than the speed of the engine shaft, either higher or lower, by an amount governed by the tooth length of the shaft gears, plus clearance, does not present any particularly difficult problem. It is only where the speed of the propeller shaft in reverse is required to be so closely equal to the speed of the engine shaft that the tip diameter of one shaft gear lies within the axially-projected tooth space of the other shaft gear so that the long pinion gear interferes with one or the other of the shaft gears that the problem becomes difficult. It is apparent that the solution of the problem with standard gears cannot be made with a long, one-diameter pinion and equal diameter shaft gears; nor can the problem be solved by equal diameter shaft gears and a two-diameter pinion gear because the ratios of the two shaft gears with their respective pinion sections cannot be equal. It is only when the two-diameter pinion gear is used and the ratios of diameters of the shaft gears with their respective pinion gears are equal and the shaft gears differ in diameter by an amount permitting clearance between the small diameter step of the pinion and its associated shaft gear that the propeller shaft can be given a speed equal to the engine shaft, when the gearing is set for reverse drive. Such an arrangement constitutes an object of the present invention.

In reverse gearing of the type to which this invention relates there are usually two sets and frequently three sets of pinion and reversing gears connecting the engine and propeller shaft gears in order to increase the capacity of the gear train and to balance the gear thrust. In assembling the gearing, the long pinion and reversing pinion gears are first installed in the carrier, the propeller shaft gear is then inserted in mesh with the long pinion and the engine shaft gear is then inserted to mesh with the reversing pinion gears. When, however, the long pinion is of two diameters, with gear teeth of the same diametrical pitch, difficulty usually is encountered in assembling the engine gear because of tooth interference with the reversing pinions. The long pinions and the reversing pinion gears thus have to be rotated until their teeth align with the respective shaft gears before the shaft gears can be moved into the carrier.

To facilitate the installing of the gears it is a further object of the present invention to make the sets of gears of different diametrical pitch, that is to say, the engine shaft gear, the reversing idler gear, and one set of teeth of the pinion gear will be of one diametrical pitch and the propeller shaft gear and the other set of teeth of the pinion gear will have a different diametrical pitch. With this arrangement all of the teeth of both shaft gears can be in line or, if not in line, can be displaced equal amounts. Thus the assembly of the several sets of pinion gears is easy and careful search for meshing points does not have to be made.

Another object is generally to improve the construction and operation of reverse gearing.

Figure 1:
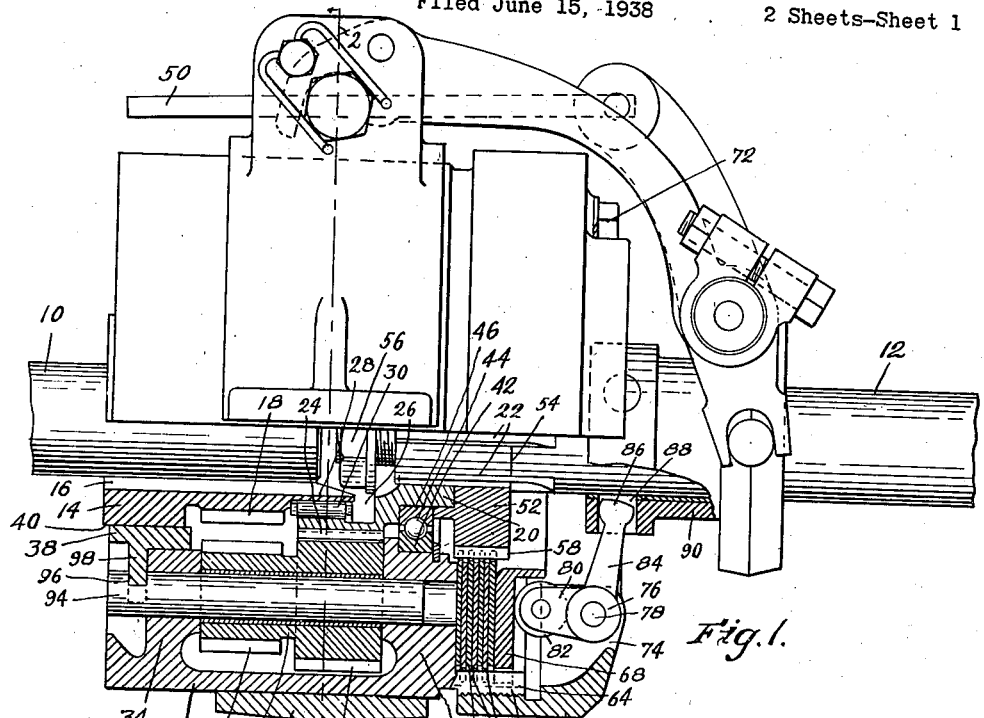
Fig. 1 is a side view partly in sectional elevation, illustrating the present invention, the section being taken along line 1—1 of Fig. 2.

The reverse gearing herein selected to illustrate the invention is in general of the type illustrated in Patent No. 1,942,318, dated January 2, 1934.

The gearing is adapted to connect the driving or engine shaft 10 and the driven or propeller shaft 12, the shafts being axially aligned. The gearing includes clutch mechanism for connecting the shafts for conjoint rotation for forward drive of the propeller shaft and reversing gearing which reversely connects the shafts through the gearing for reverse drive of the propeller shaft.

In accordance with the present invention the reverse gearing is such as to obtain the same speed of the driven or propeller shaft on reverse drive as the speed of the engine shaft. The reverse gearing includes a gear having a driving hub 14 which is keyed by a key 16 to the engine shaft and spur gear teeth 18 on the hub. There is a driven spur gear on the propeller shaft which includes a hub 20 internally splined and meshing with the splines 22 of the propeller shaft. Said hub has spur gear teeth 24 thereon. The driven gear is provided with an annular recess 26 which surrounds an annular projection 28 of the driving gear. Antifriction rollers 30 engage the wall of the recess and the annular face of the projection to support the gears in axial alignment.

The reverse gearing includes a planetary gear carrier comprising a cylinder or drum 32 surrounding said shaft gears and having inwardly extended front and rear walls 34 and 36. The front wall 34 is provided with an annular recess in which a bushing 38 is located, the bushing being journalled upon the cylindrical part 40 of the driving hub 14. The rear wall 36 is provided with an annular recess which receives the outer race 42 of a ball bearing 44, the inner race 46 of the bearing being supported upon the hub of the driven gear. Thus the carrier is rotatable on the two shafts.

Gearing hereinafter to be more fully explained is carried by the carrier and serves to connect the shafts for reverse rotation of the propeller shaft when the carrier is held stationary. The carrier is surrounded by a brake band 48 which is free from holding engagement with the carrier when the gearing is set for forward drive but is adapted to be tightened into holding engagement with the carrier by operating mechanism including an operating bar 50 to condition the gearing for reverse drive.

Forward drive is obtained by clutch mechanism which, when set, clutches the carrier to the propeller shaft against independent rotation with respect thereto. Said clutch mechanism includes a clutch plate carrier 52 which is internally splined and engaged with the splines 22 of the propeller shaft. Said carrier is clamped against a shoulder 54 of the propeller shaft by a nut 56 which is screw-threaded on the end of the propeller shaft and bears against the clutch plate carrier through the hub of the driven spur gear. The clutch plate carrier is provided with a plurality of peripherally disposed teeth or splines 58 which are slidably located in recesses formed in the inner periphery of a set of clutch plates 60 which surround the carrier and outstand radially therefrom in the rear of the gear carrier 32. Said clutch plates are alternated with the clutch plates 62 of a second set which have grooves or recesses in their outer periphery which are slidably engaged with teeth or splines 64 that are integral with and project rearwardly from the rear wall 36 of the gear carrier and are disposed internally of a rearwardly projecting annular ring 66 which encloses the clutch plates and is integral with the carrier. An annular pressure plate 68 is disposed against the outermost clutch plate and is slidably engaged with the teeth 64 and is adapted to be urged forwardly to compress the plates against each other upon the rear wall 36 of the gear carrier.

The operating mechanism for the clutch includes an annular ring 70 which is internally screw-threaded upon the ring 66 of the rear carrier and can be locked in any adjusted position thereon by means including the locking bolt 72. Said ring 70 carries a plurality of inwardly projecting ears 74 on which bell cranks 76 are pivoted by pins 78. Each bell crank has a generally axially extended arm 80 which projects towards the clutch plates and has a roller 82 thereon which is adapted to press against the rear face of the pressure plate 68. The bell crank also has an inwardly projecting arm 84 terminated in a spherically shaped head 86 that is received loosely within a cylindrical aperture 88 in an outstanding flange of an operating sleeve 90 which is slidable axially on the propeller shaft in opposite directions to set and release the clutch. It is apparent that when the sleeve 90 is moved in a rearward direction the rollers 82 pass inwardly over the face of the pressure plate 68 until the arms 80 are substantially straight and thereby cause the clutch plates to frictionally engage to clutch the gear carrier to the propeller shaft for the conjoint rotation thereof.

The drive is thus transmitted through the locked gearing elements to the propeller shaft and the shaft rotates forwardly at the speed of the engine shaft.

In gearing of the type described it is common to connect the engine and propeller shaft gears by a long one-diameter pinion gear which overlies both shaft gears and meshes with one gear and clears the other gear and is connected to the other gear through a reversing idler pinion. As explained above this type of gearing cannot give the propeller shaft in reverse drive the same speed as the engine shaft.

In accordance with the present invention there is provided a long pinion gear 92 which overlies both shaft gears and is journalled on a pin 94 located in aligned apertures in the end walls 34 and 36 of the gear carrier 32. The pin is locked in place by being provided with a slot 96 in one end thereof in which is located a radial lug 98 of the bushing 38.

Figure 3:
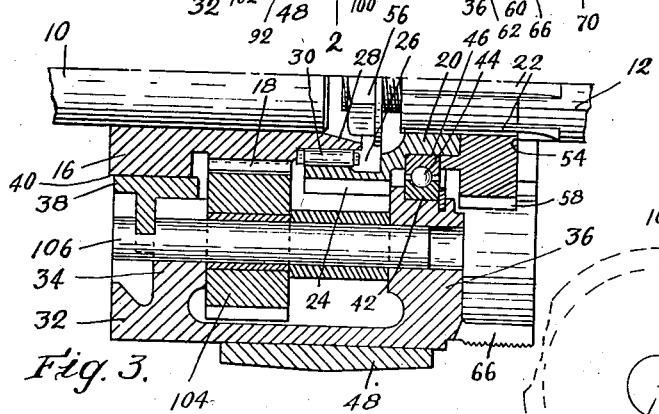
Fig. 3 is a section taken along line 3—3 of Fig. 2.

Also in accordance with the present invention the pinion gear 92 is provided with two sets of gear teeth of different pitch diameters, that is to say, a set of pinion gear teeth 100 which mesh with the gear teeth 24 of the propeller shaft gear and a set of pinion gear teeth 102 of smaller pitch diameter than the gear teeth 100 which confront but do not engage the engine shaft gear 18. A reversing idler pinion gear 104, see especially Fig. 3, is journalled on a pin 106 similar to the pin 94 located in the end walls 34 and 36 of the gear carrier. Said reversing gear is in mesh with the teeth 18 of the driving or engine gear and with the teeth 102 of the long pinion. Thus when the gear carrier is held stationary the reverse drive of the propeller shaft is from the engine gear through the reverse idler gear 104 to the small diameter teeth 102 and through the pinion 92 to the teeth 100 and thence to the teeth 24 of the propeller gear, the propeller gear rotating reversely of the engine shaft gear by reason of the reversing pinion 104.

The engine shaft gear 18 is of smaller pitch diameter than the propeller shaft gear 24 and the teeth 102 of the long pinion are of smaller pitch diameter than the pinion teeth 100. The ratio of pitch diameter of the pinion teeth 102 to the pitch diameter of the driving teeth 18 is equal to the ratio of the pitch diameter of the pinion teeth 100 to the pitch diameter of the driven teeth 24. Hence the speed of the propeller shaft when the gearing is set for reverse drive is equal to the speed of the engine shaft.

All the gear teeth can be of the same diametrical pitch, that is, the same number of teeth per inch of diameter of the pitch circle of the gear. Since, however, the gearing is provided with two and some times three sets of stepped pinion and reversing gears difficulty is experienced in assembling the second and third sets of gears because there are only a few teeth that can be meshed together and the gears have to be rotated until these teeth are found. These points of proper meshing have to be found by rotating the gears during the assembly process.

Figure 4:
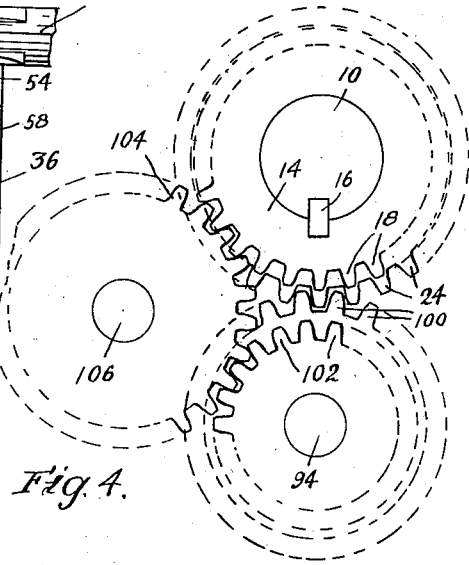
Fig. 4 is an end detail looking toward the propeller shaft and illustrating the relation between the shaft gears and a set of the pinion and reverse gears.
Figure 2:
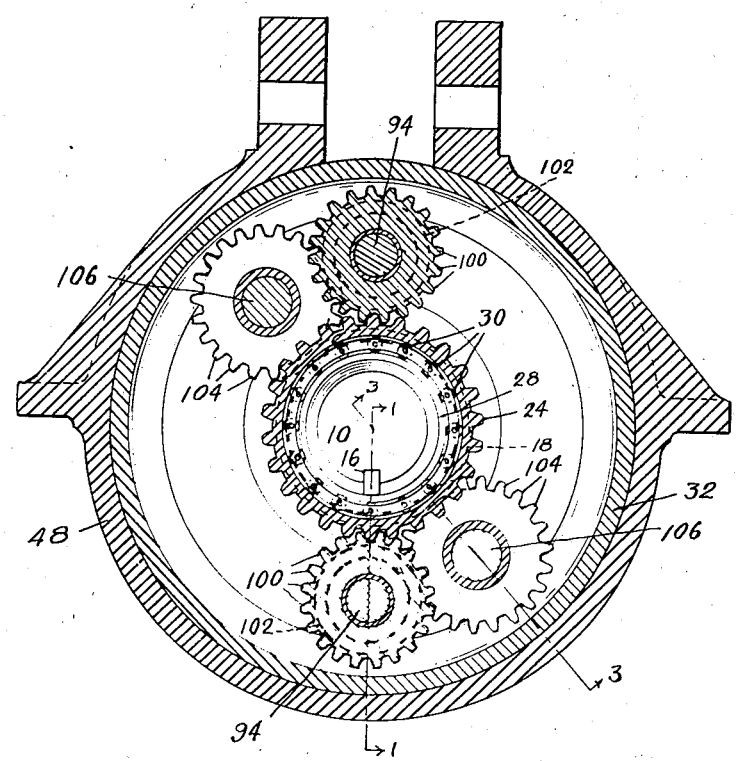
Fig. 2 is a section taken along line 2—2 of Fig. 1.

In accordance with the present invention this objection is avoided by making the intermeshing sets of gears of different diametrical pitches so that the gears can be meshed readily without the necessity for searching for the proper meshing points. Fig. 4 illustrates the arrangement of the teeth of the various gears when the teeth are of different diametrical pitches, that is to say, the driving teeth 18, the reversing pinion gear teeth 104, and the small diameter section 102 of the long pinion 92 are all of the same diametrical pitch and the teeth 100 of the pinion 92 and the teeth 24 of the driven gear are of the same diametrical pitch but a different diametrical pitch than the first named gears. With this arrangement the driving and driven gear teeth 18 and 24 which are of different diametrical pitch, can have their teeth in radial line, as illustrated in Fig. 4, or they can be displaced angularly equal amounts. Thus the installation of the shaft gears is made easy. For instance, the driving gear can be an eight diametrical pitch having twenty-six teeth and the driven or propeller shaft gear can be a nine diametrical pitch gear having twenty-six teeth. By reason of the differences in diametrical pitch the nine pitch gear will be the bigger pitch diameter gear.

For reverse speed of the propeller shaft equal to the speed of the engine shaft or so nearly equal that a single long diameter pinion when properly in mesh with one shaft gear would interfere with the other gear, the two shaft gears can have the same total number of teeth but different diametrical pitches or they can have a different number of teeth and the same diametrical pitch. In both cases, however, the ratio of the engine shaft gear to the associated long pinion section and the ratio of the propeller shaft gear to its associated section of the long pinion gear is not changed.

We claim:

1. Reverse gearing for connecting a driving and a driven shaft for rotation of the driven shaft in the same direction as the driving shaft and also for rotation in the opposite direction at the same speed as the driving shaft comprising clutch mechanism for connecting the shafts for rotation in the same direction and reversing gearing for connecting the shafts for reverse rotation of the driven shaft at the same speed as the driving shaft including driving and driven shaft gears, said gears having the same number of teeth but different diametrical pitches, a rotatable gear carrier, a plurality of sets of gears carried by said carrier and connecting said shaft gears, each set of gears comprising a long pinion having one set of gear teeth meshing with one shaft gear and having the same diametrical pitch thereof and a second set of gear teeth of different pitch diameter than said first set of gear teeth and the same diametrical pitch as said other shaft gear associated but out of mesh therewith, a reversing pinion meshing with said other set of gear teeth and said other shaft gear, the speed changing ratios of the gears of the same diametrical pitch being substantially equal, and means for holding said carrier stationary to secure reverse drive of the driven shaft.

2. Reverse gearing for connecting driving and driven shafts for rotation of the driven shaft in the same and also in the opposite direction as the driving shaft, comprising aligned driving and driven shaft gears, a pinion carrier, a reversing gear journalled in said carrier having teeth that mesh with a shaft gear, a pinion gear having teeth that mesh with said reversing gear and other teeth that mesh with said other shaft gear, said reversing gear and the meshing pinion teeth and the meshing shaft gear having a common diametrical pitch, said other shaft gear and the pinion teeth meshing therewith having a common diametrical pitch that is different from said first named diametrical pitch.

WALTER C. WARE.
RUSSELL E. ALLEN.